Figure 1:
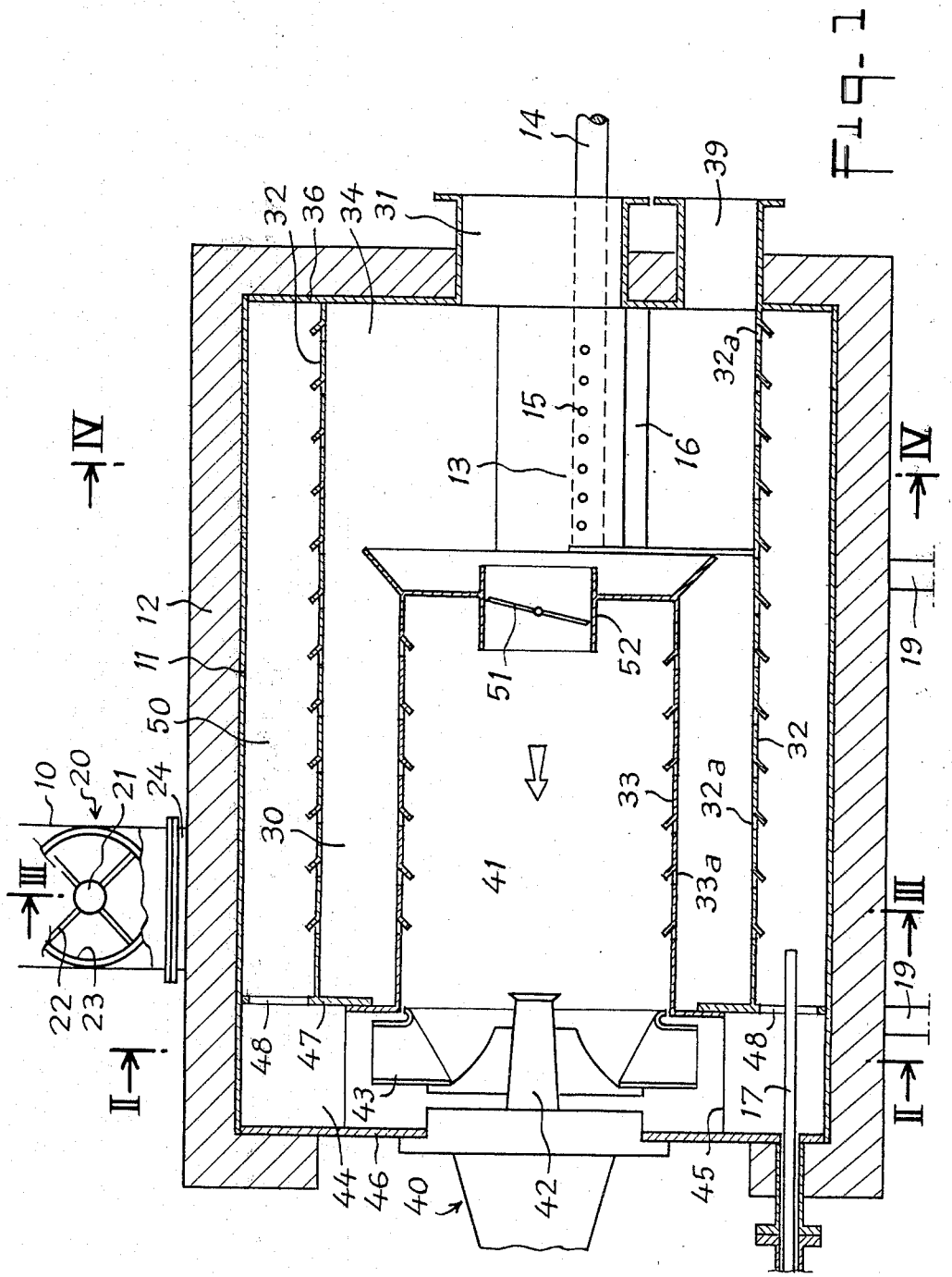

United States Patent [19]

Lucas et al.

[11] 4,335,664

[45] Jun. 22, 1982

[54] METHOD AND APPARATUS FOR THE THERMAL TREATMENT OF COMBUSTIBLE MATERIAL

[75] Inventors: Jean M. Lucas, Paris; Jean F. Molle, Choisy-le-Roi, both of France

[73] Assignee: Cemagref, Antony, France

[21] Appl. No.: 83,528

[22] Filed: Oct. 10, 1979

[30] Foreign Application Priority Data

Oct. 11, 1978 [FR] France .................................. 78 28963

[51] Int. Cl.³ ................................................ F23G 5/00
[52] U.S. Cl. ............................... 110/346; 34/57 E; 110/204; 110/244; 110/264
[58] Field of Search ............... 110/346, 243, 244, 264, 110/204; 431/116, 115; 34/57 E

[56] References Cited

U.S. PATENT DOCUMENTS

| | | | |
|---|---|---|---|
| 2,330,545 | 9/1943 | Benoit | 34/57 E |
| 3,238,991 | 3/1966 | Goldmann et al. | 431/116 X |
| 3,577,940 | 5/1971 | Hasselbring | 110/244 X |
| 3,924,548 | 12/1975 | DuChambon | 110/244 X |
| 4,052,266 | 10/1977 | Griffith | 110/264 X |

FOREIGN PATENT DOCUMENTS 5888 11/1967 Australia.

*Primary Examiner*—Edward G. Favors
*Attorney, Agent, or Firm*—Staas & Halsey

[57] ABSTRACT

The present invention relates to a method and apparatus for the thermal treatment of combustible materials wherein the materials to be treated are introduced in a cylindrical enclosure of horizontal axis. A stream of hot gases flowing around the horizontal axis places the particles of materials in suspension. A fraction of the hot gases is recycled outside the enclosure with a view to being re-introduced therein. The apparatus is particularly suitable for treating fine vegetable materials, such as chopped straw.

9 Claims, 4 Drawing Figures

METHOD AND APPARATUS FOR THE THERMAL TREATMENT OF COMBUSTIBLE MATERIAL

The present invention relates to a method and apparatus for the thermal treatment of combustible materials, and in particular vegetable and other materials such as for example urban wastes.

The expression "thermal treatment" here covers especially drying, pyrolysis and gasification.

One field of application especially aimed at by the present invention is that of the thermal treatment of fine combustible materials, namely materials of a wide granulometry ranging from dust particles to particles of a few centimeters.

By way of non-restrictive examples of vegetable materials are: coarsely cut straw, coffee, peanuts and rice husks, and crushed corn cobs.

Well known apparatus for the thermal treatment of vegetable materials are gasogenes.

The light and varying granulometry of the vegetable materials that can be treated with the thermal treatment according to the invention excludes the use of gasogenes with fixed or fluidized beds.

It is therefore the object of the invention to propose a method permitting to suspend vegetable materials uniformly in a stream of hot gases, with a view to thermally treating the different particles, equally, whatever their size.

This object is attained according to the invention with a method consisting in introducing the combustible materials to be treated in a cylindrical enclosure of horizontal axis creating a stream of hot gases flowing around the axis and re-cycling part of the hot gases produced in order to sweep along the particles of material to be treated and to place them in suspension in the stream of hot gases, close to the inside wall of the enclosure.

The combustible materials are swept along by drawing back the recycled gases outside the enclosure and by sending them through orifices provided in the peripheral wall of the enclosure.

It is a further object of the present invention to propose a device or apparatus for carrying out the method.

This object is attained with an apparatus which, according to the invention, comprises a cylindrical enclosure containing a cyclonic furnace of horizontal axis, means for producing a stream of hot gases inside the enclosure, a recycling chamber surrounding the enclosure; orifices made in the peripheral wall separating the enclosure from the recycling chamber, and a recycling device supplying said recycling chamber with hot gases taken from the enclosure so as to sweep along the combustible materials to be treated and to place these in suspension in the stream of hot gases created in the enclosure, close to the peripheral wall of the enclosure, using the recycled gases flowing through the orifices provided in the peripheral wall of the enclosure.

The use of a cyclonic furnace of horizontal axis and the recycling of hot gases, not only permit to attain the object of the present invention—which is to suspend fine particles of various sizes uniformly in a stream of hot gases—but also offer great advantages. For example, the recycled gases can also be used to cool down the wall portions situated in the regions most exposed to the hottest gases in the enclosure. When the hot gases reach a relatively high temperature (over 1000° C.), the cooling down of the walls exposed to these temperatures, by the gases recycled to a temperature of between 500° and 750° C., prevents the accumulation of the walls of particles becoming sticky at higher temperatures.

Another advantage resides in the fact that the picking up of part of the hot gases slows down the progress of the vegetable materials inside the enclosure, between the inlet and the outlet. The whole thermal treatment, such as gasification for example, can then be performed without requiring a very long enclosure. Also, in the case of gasification, the initial contact between the vegetable materials and the relatively hot recycled gases (500° to 750° C.) speeds up the drying and the pyrolysis of the materials.

Advantageously, the apparatus used for the thermal treatment of fine vegetable materials comprises at least a combustion air injector issuing, in substantially tangent manner, into the enclosure, to produce the stream of hot gases adjacent one, or the first axial end of the said enclosure, the inlet for the materials to be treated being situated at the other or second axial end of the enclosure, the outlet for the products resulting from the thermal treatment of the materials being situated at the first end.

Figure 4:
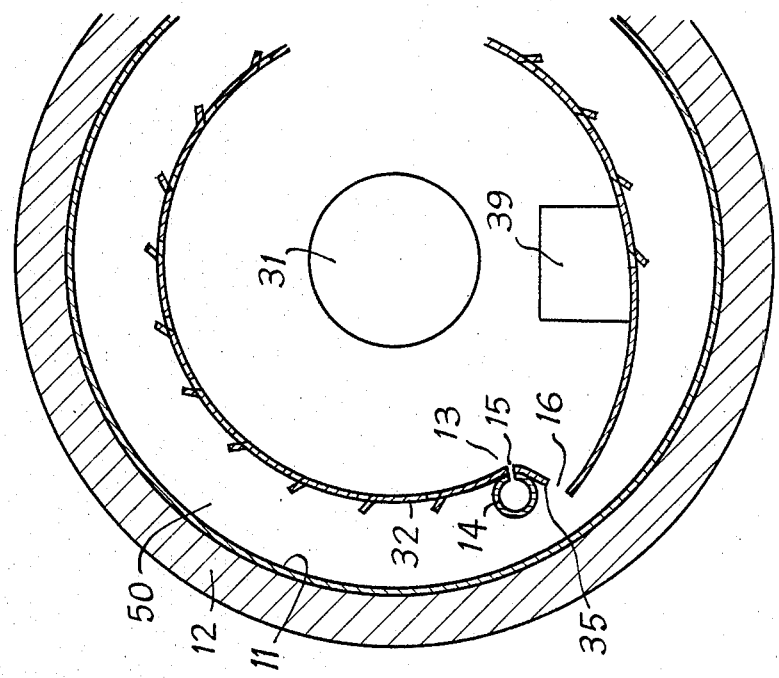
Figure 2:
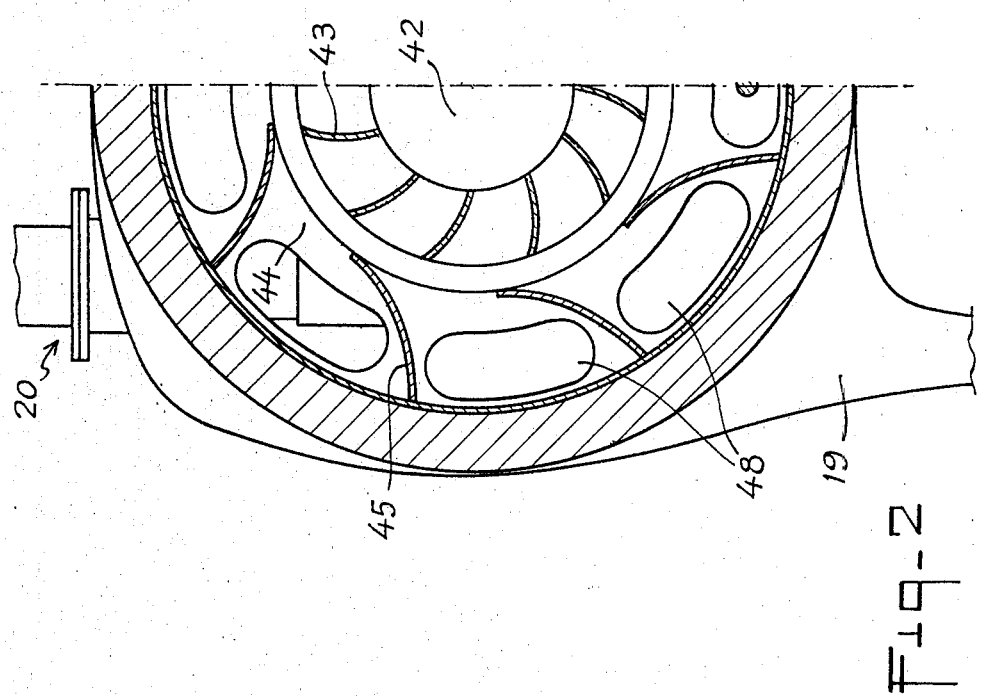
Figure 3:
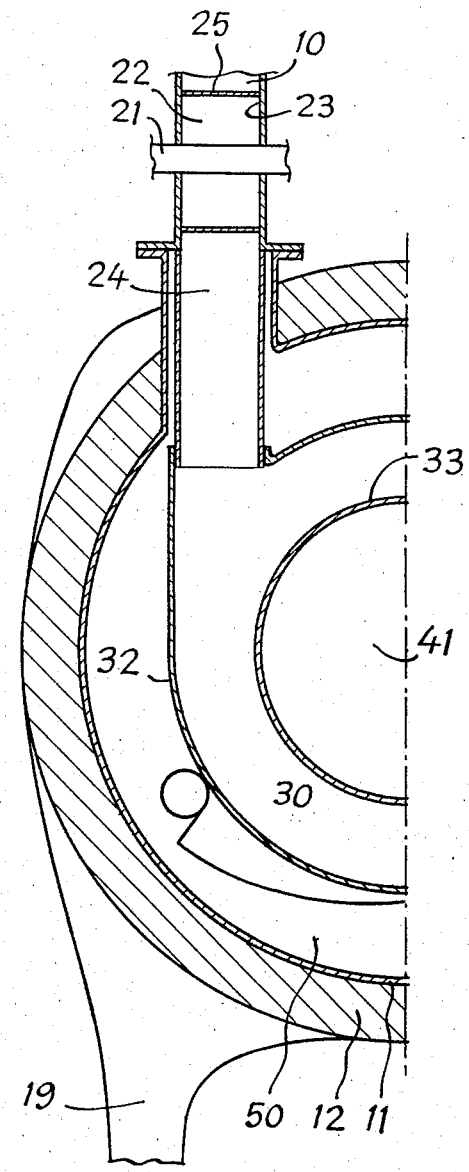

Other characteristics and advantages of the method and apparatus according to the invention will become obvious on reading the following description given by way of example and non-restrictively, reference being made to the accompanying drawings in which:

FIG. 1 is an elevational diagram and a median longitudinal cross-section of an embodiment of the thermal treatment apparatus according to the invention, and FIGS. 2 to 4 are half-cross-sectional views along lines II—II, III—III and IV—IV respectively, of FIG. 1.

The apparatus illustrated in FIGS. 1 to 4 is a gasogene intended for the gasification of fine vegetable materials, such as chopped straw for example. It is understood that, as indicated hereinabove, many other types of fine vegetable materials can equally be treated with an apparatus according to the invention.

The gasogene is supplied in continuous manner with chopped straw by an apparatus, not shown, sending into a gullet 10, particles of straw varying in sizes between dust particles and twigs of a few centimeters, for example 5 centimeters maximum.

The gasogene comprises a device 20 feeding it with chopped straw, a treatment chamber 30 forming a cyclonic furnace of horizontal axis, a recycling device 40, a recycling chamber 50 surrounding the chamber 30 and a sheet metal enclosure 11 coated with a layer of heat-insulating material 12 and surrounding the chamber 50. Feet 19 support the gasogene.

The feeding device 20 is for example of the lock type, and comprises a wheel 21 provided with paddles 22 (FIGS. 1 and 3) rotating in a housing 23. The number of the paddles 22 and their angular position are chosen so that there is never any direct communication between a gullet 10 and a passage 24, upstream and downstream respectively of the feeding device.

The paddles 22 are provided with rubber lips 25 along their edges, so that the rotation of the wheel is not impaired by twigs remaining stuck or jammed against the wall of the housing 23.

The materials needing to be gasified enter the chamber 30 from the rear (in the moving direction of the treated materials) and the gases produced come out of an axial outlet 31 at the front of the chamber 30.

The chamber 30 is defined on the outside by a cylindrical sheet metal enclosure 32 of horizontal axis. In its front part, the chamber 30 is a cylindrical hollow housing 34 sealed at the front by a radial front wall 36 into which opens the outlet 31.

The injectors 13 of combustion air, one only in the example shown (FIGS. 1 and 4), issue into the housing 34. Each air injector 13 comprises a tube 14 which is tangent, along one generatrix, to the cylinder constituting the peripheral wall of the chamber 34, and has the same length. The pressurized air injected into the tube 14 flows virtually tangentially into the chamber 34 by a series of orifices 15, positioned along a generatrix of the tube 14.

A disconnection is formed in the peripheral wall 32 of the housing 34, after the said row of air-injecting orifices, said wall being wound around the tube 14, in 35 (FIG. 4). A slot 16 is provided beneath the tube 14 to let out the recycled gases.

Moreover, an angle, of the order of 30° for example, is preferably provided between the axis of the outlet of each orifice of the injector and the tangent to the wall at the level of the said outlet. In this way, the sheet of flames produced by the different orifices of the injector is not directly applied to the inner wall of the chamber where the outlet is situated. The said angle of 30°, as well as the opening 16, prevent a heating which could bring the temperature of the wall locally to a value such that the ashes of the products would become sticky and would accumulate thereon.

The chamber 30 is provided at its rear portion with an axial cylindrical passage 41, issuing at the front into the housing 34 through an axial conduit 52 provided with an adjustable flap 51. The passage 41 is formed by a cylindrical metal sheet 33 which defines at the rear of the chamber 30 an annular recess at the back of which are introduced the combustible materials to be treated. The wall 33 is provided with orifices 33a (diagrammatically shown in FIG. 1), formed for example by stamping in the sheet 33, thus creating a communication between the said annular housing and the axial passage 41.

The conduit 41 traverses the radial back wall 47 of the chamber 30. A high temperature suction blower is positioned axially outside the said chamber 30, at the outlet of the conduit 41. The blades 43 force the gases, sucked in through the conduit 41, into passages 44 defined longitudinally by fixed blades 45 distributed around the axes of the chambers 30 and 50. The passages 44 are defined laterally by a radial wall 46 provided at the back of the gasogene and by a wall 47 forming the rear wall of the chambers 30 and 50.

Holes 48 are provided in the wall 47 to connect the passages 44 with the recycling chamber 50. Orifices 32a (diagrammatically shown in FIG. 1) are formed for example by stamping in the wall 32 and create a communication between the recycling chamber 50 and the treatment chamber 30. The orifices 32a are made in the wall 32 so that the gases passing therethrough are directed towards the front of the gasogene, thus helping the flow of the materials to be treated.

A combustible air-gas mixture can be brought into the gasogene through a pipe 17 crossing through the rear portion of the said gasogene. The pipe 17 emerges in parallel to the axis of the chamber 30 and is defined on the outside by the enclosure 11.

The gasogen operates as follows:

At the start, the pipe 17 is fed with a combustible gaseous mixture which is ignited. The hot gases thus produced enter the treatment chamber via the orifices 32a. When said chamber is hot (700° C.), the combustible materials are brought in, and then are subjected to the successive reactions of drying, pyrolysis and gasification.

When the gasification reaction has started, the air introduced through the injectors 13 and the combustible gas produced give rise to a reaction of combustion. The flames set in at the front of the chamber 30, in the vicinity of its inner peripheral wall and all around the axis of the chamber. A circular stream of hot gases is created. The supply of combustible material through the pipe 17 may be interrupted and the gasogene operates at the normal running.

Part of the hot gases produced in the housing 34 at a temperature of between 1000° and 1500° C. is picked up in the conduit 41 via the passage 52, and is recycled by means of a blower 42. The recycled gases are introduced in the chamber 50 and go through the orifices 32a. The recycled gases ensure the progress of the materials to be treated due to the orientation towards the chamber 34 of the streams of recycled gases crossing the orifices 32a and to their being placed in suspension in the hot gases at the front of the gasogene.

The "water line" phenomenon also plays a part in the progress of the materials to be treated. They indeed tend to accumulate beneath the feeding gullet 10. But the inertia of rotation tends to equalize the distribution of the materials to be treated over the whole length of the cylinder constituting the peripheral wall of the chamber 30. Said inertia creates a flow ("water line" phenomenon) from the rear zone of the gazogen (beneath the feeding gullet 10) towards the front zone (housing 34).

Gases are also recycled by going through the chamber 30 into the conduit 41 via the orifices 33a. These gases are the ones having a temperature of between 500° and 750° C., which have been cooled by the endothermic reaction of drying and pyrolysis occurring on the materials to be treated in the rear portion of the chamber 30. In this area, the progress of the materials is slowed down by the recovery of the gases through the orifices 33a.

The materials to be treated are subjected successively to drying, pyrolysis and a gasification during their progress in the chamber 30. The gasification requires a temperature of between 1000° and 1500° C. and occurs essentially in the housing 34, whereas the drying and the beginning of the decomposition only requires a temperature varying between 500° and 750° C.

The recycled gases are a mixture of very hot gases taken through the passage 52 and of less hot gases taken through the orifices 33a. The progress of the materials to be treated depends on the proportion of gases taken from the housing 34. If a small quantity of very hot gases is taken, the progress is slow, the temperature of the recycled gases is quite low and the materials to be treated remain a relatively long time in the gasification zone. The gas flow through the conduit 52 is then adjusted as a function of the time required for the gasification, which time varies depending on the materials to be treated. The adjustment may be done by adjusting the position of the flap 51. The gasogene, in this case, being intended for treating specific materials, the adjustment may be done once and for all by selecting a special passage area through the conduit 52, and it is not necessary to provide a flap 51.

As already indicated, the recycled gases may be used not only to ensure the progress and the suspension of the materials to be treated, but also for cooling those parts of wall subjected to the highest temperatures. Indeed, in temperature conditions varying between 1000° and 1500° C., the ashes of many vegetable materials become sticky and adhere to the hottest walls, and in doing so impair the good operation of the furnace.

The hot walls, and in particular at the level of the air injectors, are cooled down by a sweeping operation with the gases recycled through the openings 16.

It will be further noted that since the injection of air through the injectors 13 occurs just before the discharge of the gases resulting from the gasification, it causes the cracking—and therefore the elimination—of the tars carried by these gases. Moreover, the air admission orifices in the peripheral wall of the chamber 34 create a sheet of flames through which the particles, during their helical progress from the feeding gullet 10 towards the gas outlet 31, have to pass at least once. The passage through the sheet of flames which is in parts very hot (1500° C.) permits a total and instant gasification of the particles.

By way of example, a gasogene such as described hereinabove, has worked satisfactorily in the following conditions: supplied with chopped straw, at 10% humidity in quantity equal to 300 kg/hr—production of hot gases by supplying 800 Nm3/hr of combustible gas (heat capacity kcal/m3) and 450 Nm3/hr of air—recycling of 6000 Nm3/hr of gas (Nm3 being the volume for a temperature returned to 0° C. at atmospheric pressure).

The case considered in the foregoing is that of a gasogene.

The method and apparatus according to the invention may also be used for other heat treatments on fine combustible materials, such as for example drying or carbonizing. The temperature of the hot gases and the length of time for which the materials are kept in the treatment chamber are determined according to the desired results.

In the case of carbonizing, the resulting products are collected through a pipe 39 situated at the front of the chamber 30 and at the lower part thereof. These products can then be compressed to obtain a fuel comparable to charcoal.

Various modifications or addition may of course be made to the embodiment described hereinabove of a method and apparatus according to the invention without departing from the scope of protection described in the accompanying drawings.

What is claimed is:

1. A method for the thermal treatment of fine combustible materials by suspending said materials in a stream of hot gases, which method consists in introducing the materials to be treated into a cylindrical enclosure of horizontal axis, in creating a stream of hot gases flowing around the said axis and in recycling part of the hot gases produced in order to sweep along the particles to be treated and to place them in suspension in the stream of hot gases, close to the inside wall of the enclosure, so as to treat uniformly the fine materials of a widely varied granulometry injecting combustion air into the enclosure in the vicinity of the longitudinal end thereof, and discharging the products resulting from the thermal treatment of the materials from the same end.

2. A method as claimed in claim 1, wherein the materials to be treated are placed in suspension by drawing back the recycled gases outside the enclosure and by sending them through orifices provided in the peripheral wall of the said enclosure.

3. A method as claimed in claim 1, wherein the recycled gases are used to cool down the wall portions situated in each of the regions most exposed to the hottest gases.

4. A method as claimed in claim 1, wherein suction is applied so that the recycled gases are recovered from the enclosure by said suction in the axial part of the enclosure.

5. A method as claimed in claim 1, for the gasification of fine vegetable materials, wherein gases having a temperature varying between 500° and 750° C. are recycled in the enclosure.

6. An apparatus for the thermal treatment of fine vegetable materials, comprising an enclosure, means for introducing hot gases into the enclosure and a device for feeding the materials to be treated to the enclosure, which apparatus consists of a cylindrical enclosure containing a cyclonic furnace of horizontal axis, means for producing a stream of hot gases inside the enclosure, a recycling chamber surrounding said enclosure, orifices made in the peripheral wall separating said enclosure from the recycling chamber, and a recycling device supplying said recycling chamber with hot gases taken from the enclosure so as to sweep along the combustible particles to be treated and to place these in suspension in the stream of hot gases created in the enclosure, close to the peripheral wall of the enclosure, using the recycled gases flowing through the orifices of the peripheral wall of the said enclosure.

7. An apparatus as claimed in claim 6, further comprising at least one combustion air injector, issuing in substantially tangent manner, into the enclosure to produce the said stream of hot gases adjacent one or the first axial end thereof, the inlet for the materials to be treated being situated at the other or second axial end of the enclosure, the outlet for the products resulting from the thermal treatment of the materials being situated at the said first end.

8. An apparatus as claimed in claim 6, wherein passages communicating with the recycling chamber are provided adjacent each injector in order to cool down the wall portions of the enclosure that are situated in the regions where hot gases are injected, said cooling down being effected by means of recycled gases.

9. An apparatus as claimed in claim 6, wherein the recycling device comprises means for extracting the hot gases in the axial central area of the enclosure and for delivering the gas thus extracted into the recycling chamber.

* * * * *